Feb. 1, 1938. J. J. FICHTOL 2,106,729
TAILOR'S MEASURING DEVICE
Filed Sept. 17, 1936 3 Sheets-Sheet 1
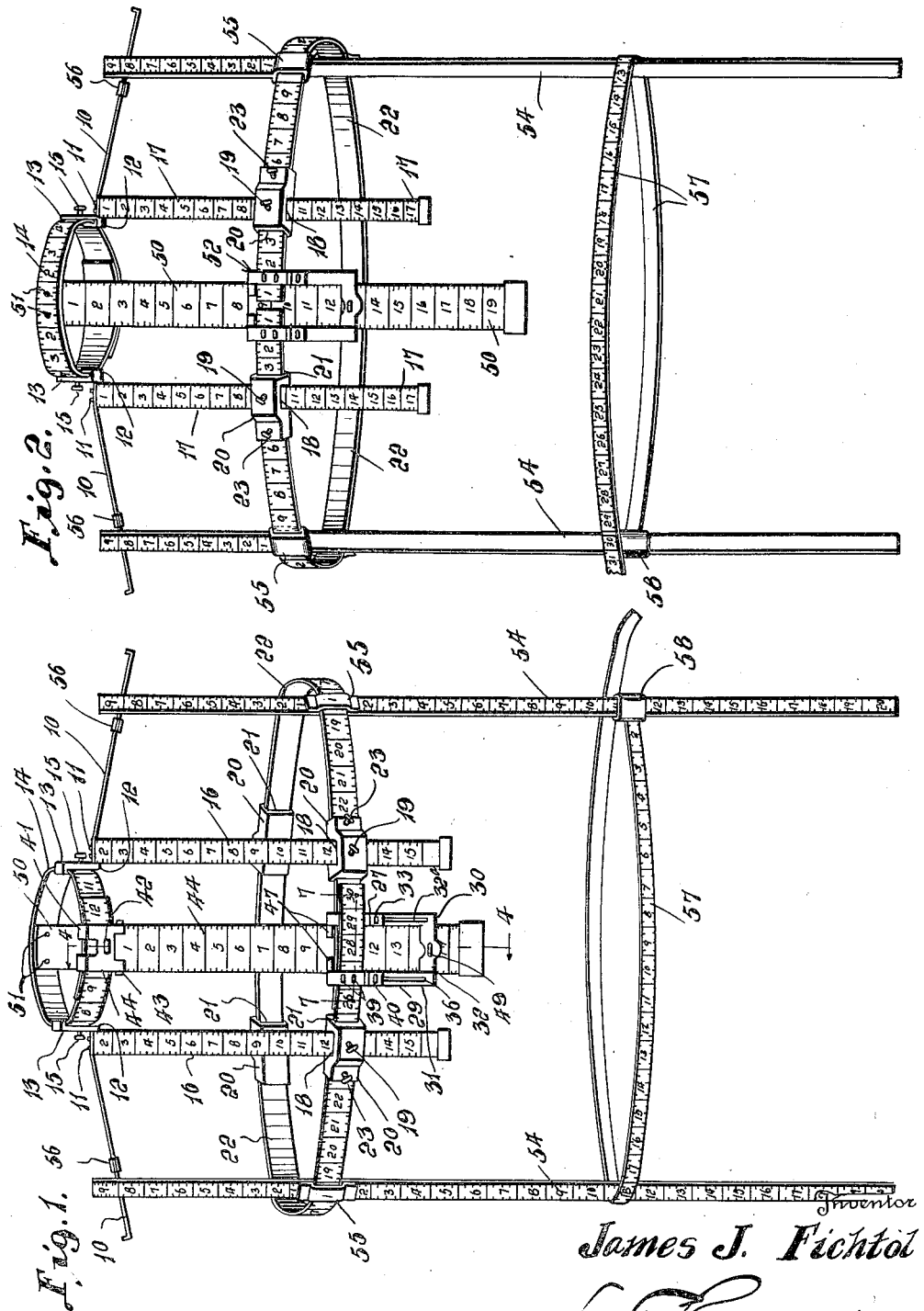
Inventor
James J. Fichtol
By L. F. Randulph
Attorney

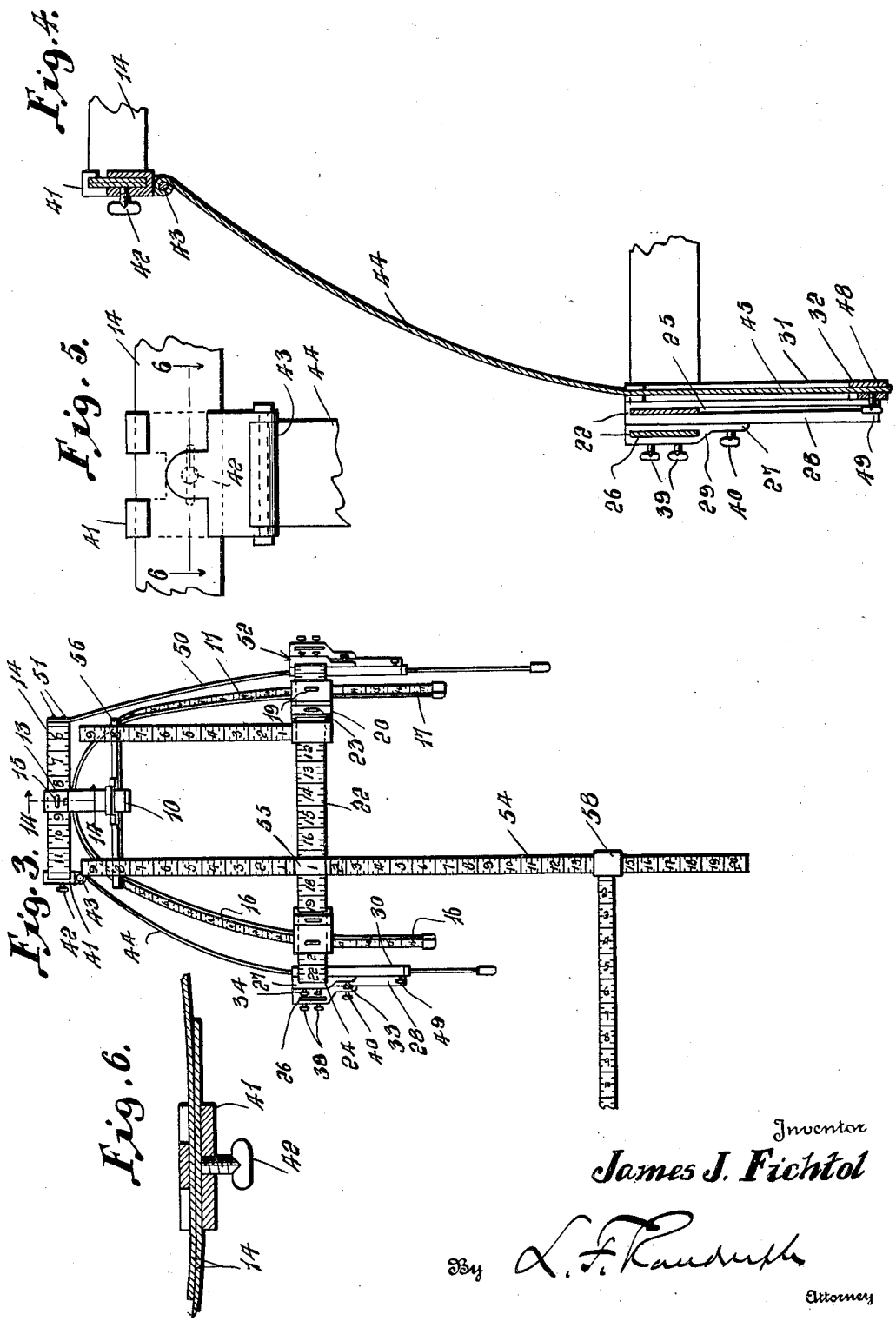

Feb. 1, 1938.                 J. J. FICHTOL                  2,106,729
                        TAILOR'S MEASURING DEVICE
                        Filed Sept. 17, 1936         3 Sheets-Sheet 3
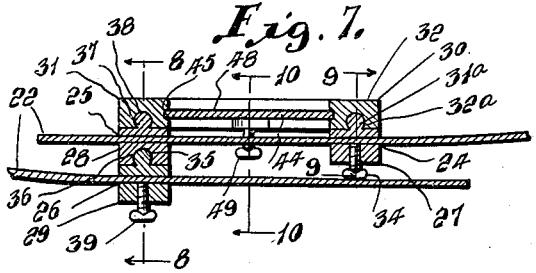
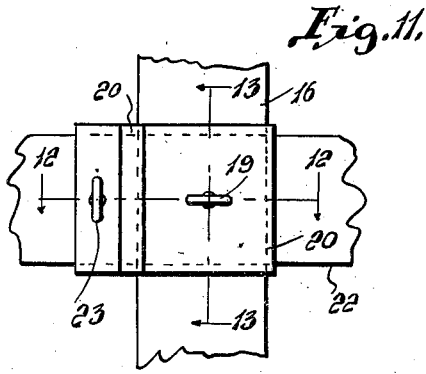
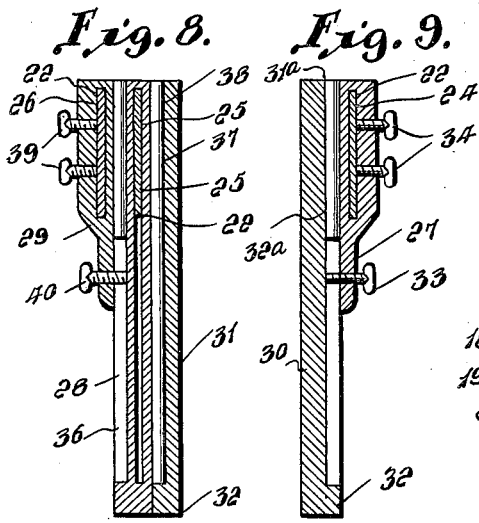
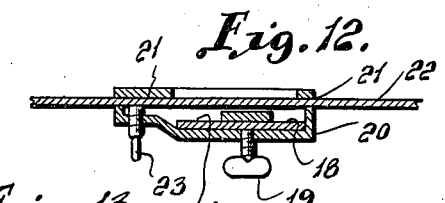
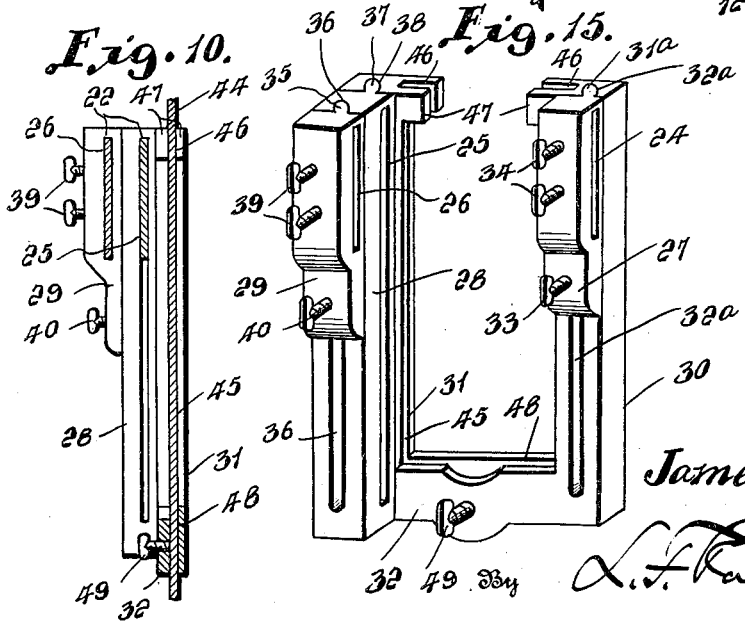
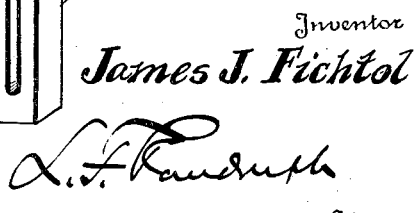
Inventor
James J. Fichtol
Attorney Patented Feb. 1, 1938

2,106,729

UNITED STATES PATENT OFFICE 2,106,729

TAILOR'S MEASURING DEVICE

James J. Fichtol, Pottstown, Pa.

Application September 17, 1936, Serial No. 101,306

6 Claims. (Cl. 33—15)

It is aimed to provide a novel structure or apparatus to aid in obtaining the various measurements from the human body, from which patterns are made or designed for men, women and children's overcoats, topcoats, ordinary coats, vests, shirts, fur coats, dresses and all garments that are suspended from the shoulders. The invention eliminates the use of instruments in the preparation of the patterns on paper or cloth and depends only on the measurements taken from the invention.

The invention particularly enables accurate fitting where the body of the person is abnormal, caused by nature, accident, slouching or otherwise, in view of which fact it is another object to provide such a structure wherein the various elements are adjustable and movable independently to give accurate measurements, and especially where there is a difference in the height of the right and left shoulders, the location of the armscyes, etc.

The more specific objects and advantages will become apparent from a consideration of the description following taken in connection with accompanying drawings illustrating an operative embodiment.

In said drawings:—

Figure 1 is a view of the apparatus in perspective and looking toward the front;

Figure 2 is a view in perspective of the apparatus looking toward the rear;

Figure 3 is a side elevation looking from the right of Figure 1;

Figure 4 is a vertical sectional view taken on the line 4—4 of Figure 1;

Figure 5 is a detail front elevation showing the hinge mounting of the front center strip;

Figure 6 is a detail cross section taken on the line 6—6 of Figure 5;

Figure 7 is a detail cross section taken on the line 7—7 of Figure 1;

Figure 8 is a vertical section taken on the line 8—8 of Figure 7;

Figure 9 is a vertical section taken on the line 9—9 of Figure 7;

Figure 10 is a vertical section taken on the line 10—10 of Figure 7;

Figure 11 is a plan view showing the connection of the intermediate strips with the neck ring;

Figure 12 is a section taken on the line 12—12 of Figure 11;

Figure 13 is a section taken on the line 13—13 of Figure 11;

Figure 14 is a detail section taken on the line 14—14 of Figure 3, and

Figure 15 is a detail perspective view of one of the clamping yokes.

Referring specifically to the drawings, the apparatus is somewhat in the nature of harness adapted to surround the body of the customer to be fitted with a coat or other article of clothing and to be suspended from the shoulders. This apparatus employs a pair of shoulder straps at 10 10 adapted to rest on the shoulders of the customer and such straps at their inner ends are riveted or otherwise fastened as at 11 to lateral arms 12 of brackets or clamps 13, the latter preferably being of C-shape as shown in Figure 14 and adjustably and slidably mounting a neck band or ring 14. The latter is made from suitable flexible metal in a single strip whereby it is adjustable as to diameter according to the size of the neck of the customer and it may be secured in the adjusted position through the medium of set screws 15 screw threaded in the clamps or brackets and in binding engagement with the ring.

Said rivets or bolts 11 also secure in place depending front intermediate strips at 16 and similar rear intermediate strips at 17.

Said intermediate strips 16 and 17, by means of slots 18 and binding screws 19, have clamps 20 vertically and independently adjustable thereon. Said clamps 20 have slots 21 extending longitudinally thereof in which two sections 22, similar in length, and collectively forming a breast ring or surcingle are adjustably mounted for independent movement, being secured in place by binding screws or the like at 23.

Centrally of the device at the front, the sections 22 respectively pass through slots 24—25 and 26 of vertically adjustable blocks 27, 28, and 29 carried by vertical bars 30 and 31 of a yoke or bracket 32. The block 27 is slidably connected to the arm 30 by an interfitted undercut rib 31ª and undercut groove 32ª, the block being fastened in adjusted position through the binding of a set screw 33 thereon against the bar 30 and the ring section 22 being fastened by the binding of set screws 34 against the same.

The block 29 is slidably interfitted with the block 28 by means of an undercut rib 35 and undercut slot 36 while the block 28 is interfitted with the arm 31 by means of an undercut rib 37 and an undercut slot or groove 38. The free end of the ring section 22 last mentioned, extends freely through the slot 25 while the adjacent end of the other ring section 22 is disposed and fastened in the slot 26 by means of set screws 39. The blocks 28 and 29 are fastened in relative adjusted positions with respect to each other and to the arm 31, by means of a set screw 40.

The ends of the neck ring 14 overlap at the front and pass adjustably through a clamp 41, preferably of C-shape and the ends of such ring 14 are secured in adjusted positions by means of a set screw 42 carried by the clamp 41. Pivoted to the clamp 41 by means of a horizontal hinge 43 is a depending, forwardly extending and somewhat bowed center strip 44 which is guided through slots 45 in the inner edges of the arms 30 and 31, by slots 46 in extensions 47 from such edges adjacent the upper ends of the arms 30 and 31 and through a slot 48 in the connecting or bridge portion of the yoke 32, being adjustably fastened in place by a set screw 49.

A rear center strip 50 is riveted or otherwise fastened at 51 to the neck ring and depends therefrom slidably and adjustably through a yoke 52, identical with that at 32 and permitting the same relative adjustment between the parts and the fastening thereof. This yoke 52 has the jaws 27, 28 and 29 associated therewith and coacting in a similar manner as at the front, with the rear ends of the breast ring sections 22. In the case of the front yoke 32 and the rear yoke 52 for either of them, the intermediate jaw 28 may be omitted so that the yoke on both sides of its longitudinal center will be exactly like that disclosed on the right hand side of that longitudinal center as in Figure 15, the grooves 45 and 47, however facing as in Figure 15.

A pair of side strips are provided as at 54, each having a loop 55 connected thereto or provided thereon, whereby they are slidable circumferentially of the sections 22 for the necessary adjustment about the body. These side strips 54 will be adjusted as to height through the vertical movement or adjustment of the breast ring sections 22.

I preferably provide a slide element 56 on each of the shoulder strap members 10 to facilitate measuring.

A flexible tape measure element 57 is connected to one of the side strips in any suitable manner, for instance by means of a slidable sleeve 58, which is useful in connection with measurements about the abdomen, the crotch and the like.

It is clear that the various parts may be made of any suitable material. With the exception of the tape measure 57, which may be either metallic or of textile material, all of the parts are preferably metallic and flexible to facilitate curling or bending where necessary to fit the contour of the body. It will be realized that all of the various elements are adjustable as described so that the strips and ring intimately fit the body and may be fastened in that relation and the necessary measurements observed and from the information obtained, patterns or designs made on paper or cloth without the aid of special instruments, greatly facilitating the work of the tailor as well as increasing the accuracy thereof. It will be noted that calibrations or measurements are provided on all of the essential parts, for instance, the neck ring 14, breast ring sections 22, front center strip 44, rear center strip 50, the shoulder straps 10, the intermediate strips 16 and 17, side strips 54, etc.

Particular attention is called to the fact that by means of the adjustments afforded by the clamps 20 and intermediate strips 16 and 17 and breast ring sections 22, that shoulder measurements may be very accurately obtained, especially in the case of drooping shoulders or where the measurement of one shoulder vary with respect to that of the other, and the construction also especially enables accurate measurement and determination of the armscyes.

Various changes may be resorted to provided they fall within the spirit and scope of the invention.

I claim as my invention:—

1. A tailor's measuring device of the class described comprising a neck ring, shoulder strap members, intermediate strips depending with relation to the straps, fastening clamps common to said neck ring, straps and strips, a measuring ring, clamps mounting said measuring ring, said strips passing adjustably through said clamps, and means to secure said clamps to said strips, side strips adjustably carried by said measuring ring, said measuring ring being in sections terminating adjacent the front center and rear center of the device, center strips depending from the neck ring, yokes connected to said center strips, and means connecting the ends of said sections to said yokes.

2. A tailor's measuring apparatus of the class described comprising suspending harness having depending front and rear center strips, a measuring ring, yokes having slots through which said strips pass adjustably, arms on said yokes, blocks slidable on said arms, said blocks being adjustably engaged by the blocks, and said blocks being adjustably engaged by the ends of said ring.

3. Apparatus of the class described having harness provided with depending front and rear center strips, a measuring ring comprising sections terminating adjacent the front and rear centers of the device, yokes having spaced apart vertical arms, said yokes having slots therethrough and slots in the inner edges of the arms adjustably engaged by the center strips, and blocks adjustable on said arms, and means adjustably securing the ends of said sections to said blocks.

4. Apparatus of the class described having harness provided with depending front and rear center strips, a measuring ring comprising sections terminating adjacent the front and rear centers of the device, yokes having spaced apart vertical arms, said yokes having slots therethrough and slots in the inner edges of the arms adjustably engaged by the center strips, and blocks adjustable on said arms, and means adjustably securing the ends of said sections to said blocks, said arms having inward extensions provided with slots registering with the slots of the arms, and through which the center strips pass.

5. Apparatus of the class described having harness provided with depending front and rear center strips, a measuring ring comprising sections terminating adjacent the front and rear centers of the device, yokes having spaced apart vertical arms, said yokes having slots therethrough and slots in the inner edges of the arms adjustably engaged by the center strips, and blocks adjustable on said arms, and means adjustably securing the ends of said sections to said blocks, said blocks and said arms being interfitted by means of undercut ribs and undercut grooves engaged thereby.

6. Apparatus of the class described having harness provided with depending front and rear center strips, a measuring ring comprising sections terminating adjacent the front and rear centers of the device, yokes having spaced apart vertical arms, said yokes having slots therethrough and slots in the inner edges of the arms adjustably engaged by the center strips, and blocks adjustable on said arms, and means adjustably securing the ends of said sections to said blocks, said blocks and said arms being interfitted by means of undercut ribs and undercut grooves engaged thereby, side strips having loops circumferentially adjustable on said sections, said harness including a circumferentially adjustable neck ring, one of said center strips being suspended from the neck ring, a clamp adjustably connecting the ends of the neck ring, the other center strip being pivotally suspended from said clamp, shoulder straps, front and rear intermediate strips, and substantially L-shaped clamp members securing said neck ring, shoulder straps and intermediate strips together.

JAMES J. FICHTOL.